Figure 1:
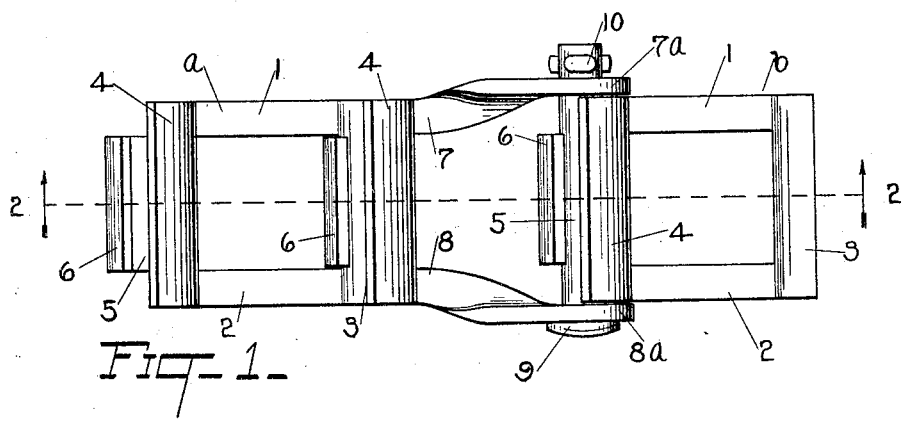

Dec. 1, 1931.  L. A. PARADISE  1,834,173

CHAIN LINK

Filed Oct. 31, 1928

Inventor
Louis A. Paradise
By W. C. Jirdinston
Attorney

Patented Dec. 1, 1931

1,834,173

UNITED STATES PATENT OFFICE

LOUIS A. PARADISE, OF MOLINE, ILLINOIS, ASSIGNOR TO DEERE & COMPANY, OF MOLINE, ILLINOIS, A CORPORATION OF ILLINOIS

CHAIN LINK

Application filed October 31, 1928. Serial No. 316,297.

My invention relates to sprocket chains of the Ewart type, and more particularly to an improved link therefor, and the object of my invention is to produce a link by the use of which a chain can be readily connected together or separated to free it from sprocket wheels upon which it may be mounted, so that the operator may readily manipulate the chain for the removal of links to shorten it; for the insertion of additional links to increase its length; to substitute perfect links for those which may be damaged; or permit repair of parts to which a chain may be attached.

To separate the links of Ewart chain, or to connect them together for use, it is necessary to angle one link relative to its adjoining link, and then by a side movement of the links detach them, or attach them together; therefore, a chain composed entirely of Ewart links necessarily must be of greater length than required to fit the sprockets over which it operates in order to provide sufficient slack for the ends of the chains to be connected or disconnected after it has been placed on the sprockets. This slack in the chain involves the use of a chain tightener, or necessitates the mounting of the sprockets so one can be shifted relative to the other, in order that the chain can be operated under the proper tension and held on the sprocket wheels. By the use of my improved link, which will readily connect with the adjoining Ewart links, I avoid the need for slack in the chain and, accordingly, obviate the employment of the costly and troublesome chain tightener or expensive mounting incident to shiftable sprockets.

Figure 2:
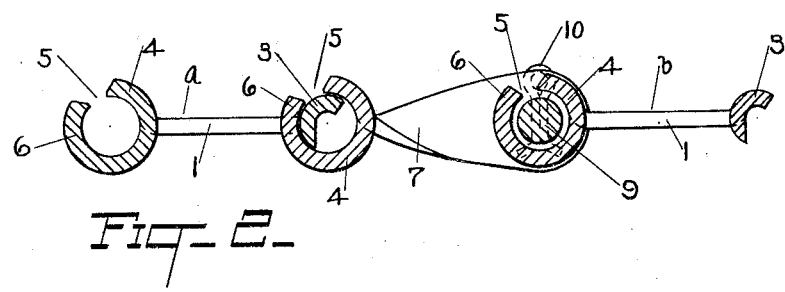

Referring to the drawings in which similar numerals indicate identical parts:

Fig. 1 is a plan view of part of a sprocket chain embodying my improved link, and Fig. 2 is a longitudinal section on the line 2—2 of Fig. 1.

My improved link is shown as connecting two conventional Ewart links, which are designated a and b, and in which links the side bars 1 and 2 are joined at one end by a semicircular bar 3, and at its opposite end by a circular bar 4 having a slot 5. The parts 6 of the bar 4 operate as a hook and of sufficient width to freely extend between the bars 1 and 2, and serve to hold the links together. To join one Ewart link with the other, it is necessary to position a link at a vertical angle until the bar 3 can slide freely into the circular bar 4, either the bar 1 or the bar 2 passing through the slot 5, depending upon the side from which the connection is made. The angled link is then turned until in the same plane as the connected link, the hook part 6 passing between the bars 1 and 2. By reversing the action described, the links can be disconnected.

As stated, it is necessary to angle one of the links to the link from which it is to be disconnected in order to separate the links. This can easily be done if the chain is not mounted on sprockets, or, if so mounted, there is sufficient slack in the chain to permit its removal from the sprockets without being disconnected; ordinarily, however, a chain tightening device is employed having means to adjust it to slacken the chain or to give it the degree of tension desired. To obviate the necessity of utilizing a chain-tightening device, and to make possible the use of Ewart chain in places where a chain-tightening device cannot be employed, I have devised a novel link, the ends of which will cooperate with the ends of Ewart links, and by means of which link the ends of a chain can be connected after the chain has been mounted on sprocket wheels, or separated for removal therefrom, and without requiring slack in the chain to accomplish such connection or separation.

My improved link is constructed at one end similar to the hook end of other Ewart links having a slotted tubular bar 4 and a hook part 6 thereof to connect it to the bar 3 with the adjacent Ewart link a, the tubular bar 4 having a slot 5 to admit of the passage of the side bar 1 or 2 of the Ewart link a in the assembly of the Ewart link with my improved link. The side bars 7 and 8 of my improved link are twisted toward each other at an angle of 90° so that their ends present flat surfaces 7a and 8a, which contact with the ends of the circular bar 4 of the adjoining Ewart link to which they are to be connected. The side bars 7 and 8 are attached to the link b by a headed bolt or pin 9, which is inserted in suitable perforations in the flat surfaces 7a and 8a, and passes through the tubular end bar 4 of the link b, the projecting end of the bolt being provided with a hole in which a cotter pin 10 is utilized to hold the bolt in place and the links safely connected. The hook part of the link b engages with the bolt 9 of my improved link in a way similar to the engagement of the hook part 6 of any Ewart link with the bar 3 thereof.

My improved link is a valuable addition to an Ewart chain because with this link in a chain, the chain can be quickly applied to sprocket wheels and connected together or separated for removal from sprocket wheels without the necessity for slack in the chain, as the pin 9 forms an attaching means that makes possible the connecting or disconnecting of the link b with my improved link without angling one link relative to the other. It is apparent that an Ewart chain provided with one of my improved links can be readily mounted on sprockets without the usual after-resulting slack and consequent necessity for a chain tightener.

My link can be manufactured and sold separately from the chain to which it is applicable, for it can be readily made part of Ewart chains now in use.

What I claim is:

1. A connector link for the type of chain described and made of sheet metal, said link comprising a tubular bar at one end having a longitudinal slot, a part of said bar forming a hook to connect with an adjacent link of said chain, side bars integral with said tubular bar and twisted at an angle of 90° and toward each other, holes in the free ends of said bars to register with a tubular part of an adjacent link of said chain, and a bolt extended through said tubular part and holes.

2. As a new article of manufacture, a chain connector link made of sheet metal and comprising a tubular bar at one end thereof having a longitudinal slot, a part of said bar forming a hook, and side bars integral with said tubular bar and twisted at an angle of 90° toward each other and a hole in the free ends of each bar.

LOUIS A. PARADISE.